W. J. & P. COOK.
SPRING WHEEL.
APPLICATION FILED JUNE 2, 1911. RENEWED FEB. 6, 1913.
1,076,003.
Patented Oct. 14, 1913.
2 SHEETS—SHEET 1.
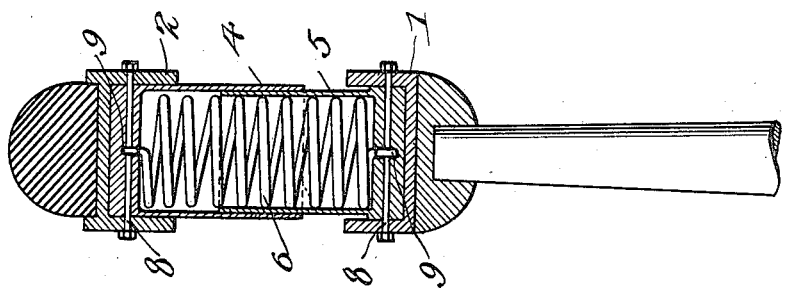
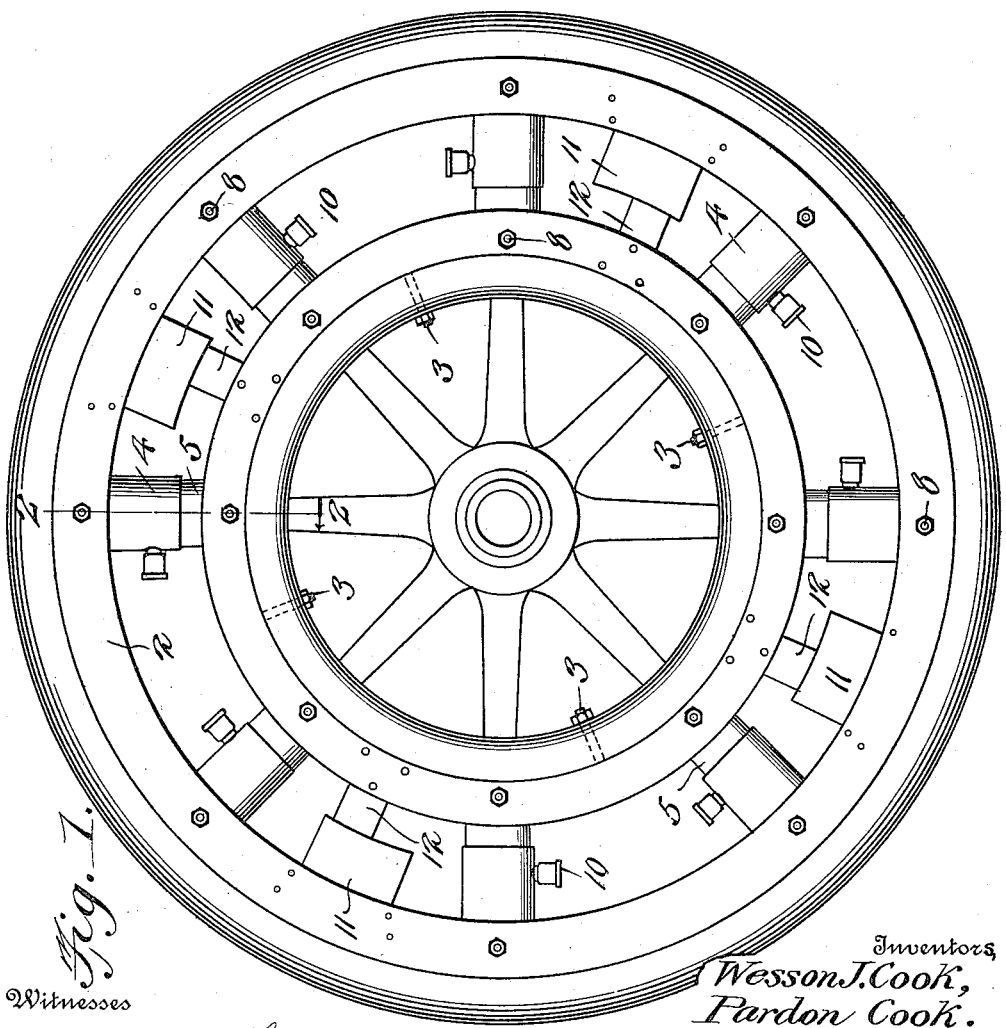
Witnesses
Frank B. Hoffman
U. B. Hillyard
Inventors
Wesson J. Cook,
Pardon Cook.
By Victor J. Evans
Attorney W. J. & P. COOK.
SPRING WHEEL.
APPLICATION FILED JUNE 2, 1911. RENEWED FEB. 6, 1913.
1,076,003.
Patented Oct. 14, 1913.
2 SHEETS—SHEET 2.
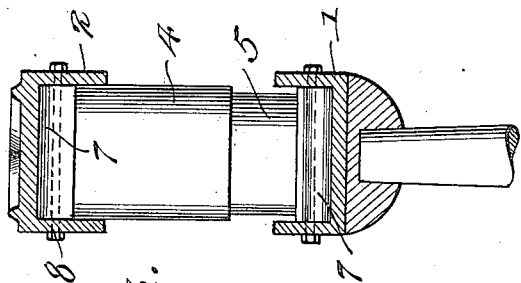
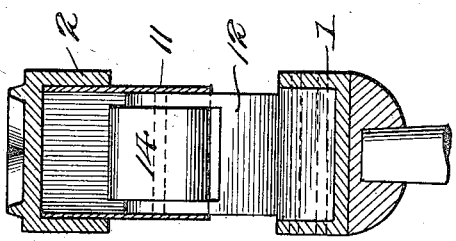
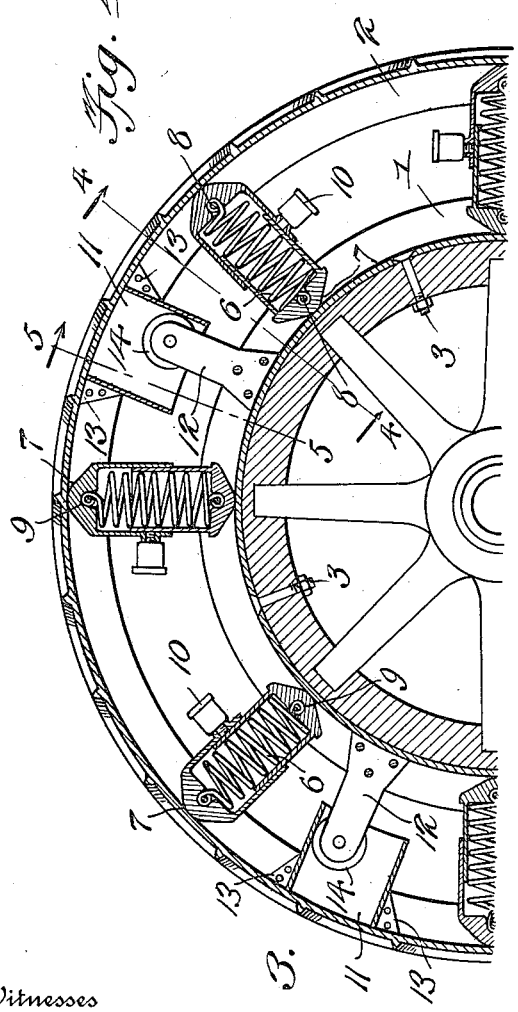
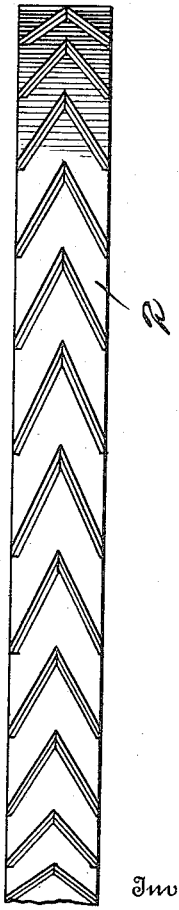
Witnesses
Frank B. Hofman
V. B. Hillyard
Inventors
Wesson J. Cook,
Pardon Cook.
By Victor J. Evans
Attorney

UNITED STATES PATENT OFFICE.

WESSON J. COOK AND PARDON COOK, OF ALBANY, NEW YORK.

SPRING-WHEEL.

1,076,003.  Specification of Letters Patent.  Patented Oct. 14, 1913.

Application filed June 2, 1911, Serial No. 630,770. Renewed February 6, 1913. Serial No. 746,667.

*To all whom it may concern:*

Be it known that we, WESSON J. COOK and PARDON COOK, citizens of the United States, residing at Albany, in the county of Albany and State of New York, have invented new and useful Improvements in Spring-Wheels, of which the following is a specification.

The present invention relates to vehicle wheels of the variety having an outer portion made yieldable so as to compensate for shock and vibration and thereby add to the comfort of the occupant of a vehicle besides reducing the wear and tear upon the vehicle equipped with wheels of the nature aforesaid.

The invention contemplates a vehicle wheel embodying inner and outer rims between which are interposed cushioning and guide devices whereby the tread portion of the wheel is adapted to yield and is braced laterally so as to withstand transverse strain.

The invention consists of the novel features, details of construction and combination of parts, which hereinafter will be more particularly set forth, illustrated in the accompanying drawings, and pointed out in the appended claim.

Referring to the drawings, forming a part of the specification, Figure 1 is a side view of a spring wheel embodying the invention. Fig. 2 is a sectional detail on the line 2—2 of Fig. 1. Fig. 3 is a longitudinal section of one-half of the wheel. Fig. 4 is a section on the line 4—4 of Fig. 3. Fig. 5 is a section on the line 5—5 of Fig. 3. Fig. 6 is an edge view of a part of the wheel.

Corresponding and like parts are referred to in the following description, and indicated in all the views of the drawings, by the same reference characters.

The invention relates more particularly to the outer portion of the vehicle wheel, the same comprising an inner rim 1 and an outer rim 2. Between these two rims are interposed cushioning and guide devices. The inner rim 1 is adapted to be secured to the felly or rim proper of the wheel or the inner or center portion. The inner or center portion of the wheel may be of any construction and as illustrated is of ordinary form comprising a hub, spokes and felly.

The inner rim 1 is substantially of U-form in cross section and is arranged with the hollow side facing outwardly. The outer rim 2 may be of any formation in cross section and is of U form both upon its inner and upon its outer side. The inner rim 1 may be secured to the felly of the wheel or inner portion thereof in any manner, as by bolts 3 or other suitable fastening means. The tire is fitted to the outer rim 2 and may be seated in the outer channel or groove thereof and may consist of rubber or be formed of metal, the latter type of tire being provided with cogs or ribs upon its outer surface to prevent slipping.

The cushioning devices comprise essentially three parts, an outer barrel 4, an inner barrel 5 and helical springs 6, the latter being of the expansible type and located within the barrels 4 and 5, which latter have a telescoping arrangement and are secured to the respective rims of the outer portion of the wheel. The ends of the barrels 4 and 5 are made rounding, as indicated at 7, to admit of the cushioning devices having a pivotal movement in the plane of the wheel, whereby the outer rim 2 has a limited circumferential movement to compensate in a measure for strain. The outer ends of the barrels 4 and 5 are of a width to fit snugly between the side flanges of the respective inner and outer rims and are made heavy so as to provide a substantial structure and to receive the bolts or pivot fastenings 8 by means of which the barrels are connected to the side flanges of the rim. The helical springs 6 have eyes 9 at their ends through which bolts or pivot fastenings 8 pass so as to positively connect said springs to the rims. An oil cup 10 is fitted to each of the barrels 4 to admit of supplying lubricant to the overlapping or telescoping portions of the barrels to reduce the friction and wear to the smallest amount possible.

There may be as many cushioning devices interposed between the rims as may be found necessary depending upon the size of the wheel and the load to be carried thereby.

The guide devices are located at proper points in the circumference of the outer yieldable portion of the wheel so as to stiffen and strengthen the same against transverse strain. Each of the guide devices consists of a box 11 and a plunger 12, said parts being secured to the respective rims. Each of the boxes 11 is of rectangular form and is provided with ears 13 to abut against the inner faces of the side flanges, said ears being apertured to receive rivets or other fastenings by means of which they are secured to the flanges of the rim. The plungers 12 have their base portions extended and transversely apertured to receive fastenings which pass therethrough and through the side flanges of the rim to which said plungers are attached. The plungers are of a width to obtain a snug fit between the side walls of the box so as to brace the outer rim against lateral strain. A roller 14 is mounted in the outer end of each plunger and projects beyond the extremity and the front and the rear sides thereof to engage and roll upon the front and rear walls of the boxes and the bottom thereof when the inner rim is depressed under the weight of the load. It is preferred to have the boxes 11 secured to the outer rim 2 and the plungers 12 attached to the inner rim 1. The distance between the front and rear walls of the boxes is greater than the diameter of the rollers 14 or the distance between the front and rear walls of the plungers, thereby admitting of the outer rim 2 having a limited circumferential movement, which is determined by the play of the plungers between the front and rear walls of the boxes.

From the foregoing description, taken in connection with the accompanying drawings, the advantages of the construction and of the method of operation will be readily apparent to those skilled in the art to which the invention appertains, and while we have described the principle of operation of the invention, together with the device which we now consider to be the embodiment thereof, we desire to have it understood that the device shown is merely illustrative, and that such changes may be made when desired as are within the scope of the claim appended hereto.

Having thus described the invention what is claimed as new, is:—

In a vehicle wheel comprising inner and outer channel rims with the channel sides facing, cushioning devices interposed between the rims, each cushioning device formed of telescoping barrels and a helical spring, the latter having eyes at its ends, the outer ends of the barrels being heavy and of such a size as to touch the inner walls of the side flanges of the rims and having their extremities made rounding, and fastenings passing transversely through the outer ends of the barrels, the side flanges of the rims and the eyes of the springs and connecting the several parts.

In testimony whereof we affix our signatures in presence of two witnesses.

WESSON J. COOK.
PARDON COOK.

Witnesses:
W. E. WOOLLARD,
BERTRAM M. AUFSESSER.